United States Patent
Wang et al.

[11] Patent Number: 6,154,400
[45] Date of Patent: Nov. 28, 2000

[54] DUAL BIT LINE EQUALIZING CIRCUITS FOR A SEMICONDUCTOR MEMORY DEVICE

[75] Inventors: Shiou-Yu Alex Wang, Fremont, Calif.; Ping Chao Ho, Taipei; Ming Shiang Wang, Taichung, both of Taiwan

[73] Assignee: Nanya Technology Corporation, Taiwan

[21] Appl. No.: 09/505,287

[22] Filed: Feb. 16, 2000

[30] Foreign Application Priority Data

May 18, 1999 [TW] Taiwan .................................. 88108064

[51] Int. Cl.[7] ........................................................ G11C 7/12
[52] U.S. Cl. ............................................. 365/202; 365/190
[58] Field of Search .................................... 365/202, 203, 365/190

[56] References Cited

U.S. PATENT DOCUMENTS 4,351,034  9/1982  Eaton, Jr. et al. ..................... 365/205
4,845,672  7/1989  Watanabe et al. ..................... 365/190

Primary Examiner—Andrew Q. Tran
Attorney, Agent, or Firm—George T. Marcou; Kilpatrick Stockton LLP

[57] ABSTRACT

A dual bit line equalizing circuit for a semiconductor memory device, comprising a first bit line pair and a second bit line pair adjacent to the first bit line pair. A first primary equalizing circuit is connected between terminals of the first bit line pair, and a first secondary equalizing circuit is connected between terminals of the second bit line pair, wherein the first primary equalizing circuit and the first secondary equalizing circuit precharge and equalize the first and the second bit line pairs in response to a first equalizing instruction signal. Further, a second primary equalizing circuit is connected between other terminals of the second bit line pair, and a second secondary equalizing circuit connected between other terminals of the first bit line pair, wherein the second primary equalizing circuit and the second secondary equalizing circuit precharge and equalize the first and the second bit line pair in response to a second equalizing instruction signal.

9 Claims, 4 Drawing Sheets

DUAL BIT LINE EQUALIZING CIRCUITS FOR A SEMICONDUCTOR MEMORY DEVICE

BACKGROUND OF THE INVENTION

1. Field of the Invention

The present invention relates to a bit line equalizing circuit of a semiconductor memory device, and more particularly to a dual bit line equalizing circuit of a DRAM device.

2. Description of the Related Art

As shown in FIG. 1A, the conventional DRAM array mainly comprises a memory cell MC, which commonly includes a selection transistor T and a storage capacitor C, wherein the gate of the selection transistor T is controlled by a wordline WL. When the wordline WL is selected and results in the ON condition of the selection transistor, charges stored in the storage capacitor C are sent to the bit line BL and sense amplifier SA. After the comparison of the sense amplifier SA, the logic output of the memory cell MC is determined and sent to the I/O data line to be read.

As mentioned above, the storage capacitor C discharges during the read of the memory cell MC; thus, the data isn't stored in the memory cell. So, it is necessary for the sense amplifier SA to restore the charges in the memory cell MC before completing the data reading.

U.S. Pat. No. 4,351,034 discloses a shared sense amplifier, wherein a memory cell array is divided into two blocks and sense amplifiers are disposed and shared between the two blocks. During the sensing operation, only the columns in one block are connected to the sense amplifier; the columns of the other block are subsequently connected to the sense amplifier after the sensing operation.

FIG. 1B illustrates a memory array of the prior art, in which the bit line pairs BL1/$\overline{BL1}$, BL2/$\overline{BL2}$ of memory cell block 100 and relative sense amplifier circuits 120a, 120b are disposed as shown. The memory cell MC is disposed between one wordline WL and a pair of bit lines BL1/$\overline{BL1}$, BL2/$\overline{BL2}$. The selection transistor T is responsive to a signal potential on the wordline WL and connects the storage capacitor C to the bit line BL1 or BL2.

In order to differentially sense and amplify a signal potential on a bit line pair BL1/$\overline{BL1}$ in the sense amplifier block 120a, a shared sense amplifier SA1 is provided to the bit line pair BL1/$\overline{BL1}$ in the prior art. The sense amplifier SA1 is often a differential amplifier, and the sensing enable signal SAE1 is used to activate the sense amplifier SA1 to do the sensing operation. Equalizing circuit EQA is provided for precharging and equalizing each bit line pair BL1/$\overline{BL1}$ to a reference voltage Vref while the semiconductor memory device is in the standby state. Moreover, the equalizing circuit EQA includes a transistor 20 (for example, an n-channel transistor) responsive to an equalization instruction signal EQ1 to electrically short-circuit the bit line pair BL1/$\overline{BL1}$, and transistors 21 and 22 (herein also taking n-channel transistors as an example) responsive to the equalization instruction signal EQ1 to transmit the reference voltage Vref to the bit line pair BL1/$\overline{BL1}$.

Bit line selecting switches BSA selectively connect the bit line pair BL1/$\overline{BL1}$ to the shared sense amplifier SA1. In other words, the bit line selecting switches BSA selectively connect the bit line pair BL1/$\overline{BL1}$ of the memory block 100 to the shared sense amplifier SA1 in response to a selection control signal TG1. The bit line selecting switches BSA includes transfer gates T10 and T11 for conducting the bit line pair BL1/$\overline{BL1}$ to the shared sense amplifier SA1 in response to the selection control signal TG1.

The I/O (input/output) switch IOSW 1 turns on in response to column selecting signal CSL1 and is used to connect the bit line pair BL1/$\overline{BL1}$ to I/O data bus 140a in response to the column selecting signal CSL1.

Also, in order to differentially sense and amplify a signal potential on a bit line pair BL2/$\overline{BL2}$ in the sense amplifier block 120b, a shared sense amplifier SA2 is provided to the bit line pair BL2/$\overline{BL2}$ in the prior art. The sense amplifier SA2 is often a differential amplifier, and the sensing enable signal SAE2 is used to activate the sense amplifier SA2 to do the sensing operation. Equalizing circuit EQB is provided for precharging and equalizing each bit line pair BL2/$\overline{BL2}$ to a reference voltage Vref while the semiconductor memory device is in the standby state. Moreover, the equalizing circuit EQB includes a transistor 23 (for example, an n-channel transistor) responsive to an equalization instruction signal EQ2 to electrically short-circuit the bit line pair BL2/$\overline{BL2}$, and transistors 24 and 25 (herein also taking n-channel transistors as an example) responsive to the equalization instruction signal EQ2 to transmit the reference voltage Vref to the bit line pair BL2/$\overline{BL2}$.

Bit line selecting switches BSB selectively connect the bit line pair BL2/$\overline{BL2}$ to the shared sense amplifier SA2. In other words, the bit line selecting switches BSB selectively connect the bit line pair BL2/$\overline{BL2}$ of the memory block 100 to the shared sense amplifier SA2 in response to a selection control signal TG2. The bit line selecting switches BSB includes transfer gates T15 and T16 for conducting the bit line pair BL2/$\overline{BL2}$ to the shared sense amplifier SA2 in response to the selection control signal TG2.

The I/O (input/output) switch IOSW 2 turns on in response to column selecting signal CSL2 and is used to connect the bit line pair BL2/$\overline{BL2}$ to I/O data bus 140b in response to the column selecting signal CSL2.

Taking the traditional reading operation in sense amplifier block 120a as an example (see FIG. 2), the semiconductor memory device is initially in a standby state, and the equalizing circuit EQA precharges and equalizes the bit line pair BL1/$\overline{BL1}$ (see FIG. 1B) to a reference voltage Vref. For example, the potential of the bit line pair BL1/$\overline{BL1}$ is set to power supply potential Vcc or ½Vcc. Then, the potential of the selection control signal TG1 is boosted to a voltage level Vcc of logic 1. The bit line selecting switches BSA are thereby in ON state, and the bit line pair BL1/$\overline{BL1}$ of the memory block 100 is selectively connected to the shared sense amplifier SA1 in response to the selecting control signal TG1.

Next, the equalizing circuit EQA ceases to precharge and equalize the bit line pair BL1/$\overline{BL1}$ when the potential of the equalization instruction signal EQ1 decreases to the low level potential of the logic 0. As a wordline WL of the memory cell block is chosen, the transistor of the memory cell MC turns on and the signal potential stored in the capacitor is transmitted to a corresponding bit line of the bit line pair BL1/$\overline{BL1}$ by the boosted potential of the wordline. The operations described above result in a potential difference between the bit line pair BL1/$\overline{BL1}$.

Then, as shown in path A1, the selecting control signal TG1 is at a boosted potential level Vcc+α, which is higher than the power supply voltage Vcc.

Thereafter, as shown in path A2, when the sensing enable signal SAE1 is boosted to a high level potential of logic 1, the sense amplifier SA1 is activated to perform the sensing operation to sense the data, which is amplified and restored.

Further, the bit line at low potential will discharge to ground voltage Vss, and the bit line at high potential will charge to the power supply voltage Vcc.

The potential of the column selecting signal CSL1 is subsequently boosted to the high voltage of logic 1, and the I/O switch IOSW1 connects the bit line pair BL1/$\overline{BL1}$ to the I/O data bus 140a in response to the column selecting signal CSL1. When the semiconductor memory device is in the reading mode, data in the I/O data bus 140a is then transmitted into the output buffer (not shown) to be the output data Dout of the output terminal.

However, because a semiconductor memory device is highly integrated in order to reduce the size of a memory cell, there is inevitably a tendency for the parasitic capacitance Cb and resistance C to increase so that the RC constant of bit line equalization increases in proportion to the factor $N^2$, wherein the factor N is the increment of the parasitic capacitor Cb and the resistor R.

SUMMARY OF THE INVENTION

Accordingly, the object of the present invention is to provide a dual bit equalizing circuit able to reduce the RC constant of the bit line equalization to a quarter of that of the prior technology.

In order to attain the object described above, the present invention provides a dual bit line equalizing circuit for a semiconductor device including a first bit line pair, and a second bit line pair adjacent to the first bit line pair. There is a first primary equalizing circuit connected between terminals of the first bit line pair, and a first secondary equalizing circuit connected between terminals of the second bit line pair, wherein the first primary equalizing circuit and the first secondary equalizing circuit precharge and equalize the first and the second bit line pair in response to a first equalizing instruction signal. Further, a second primary equalizing circuit is connected between other terminals of the second bit line pair, and a second secondary equalizing circuit is connected between other terminals of the first bit line pair, wherein the second primary equalizing circuit and the second secondary equalizing circuit precharge and equalize the first and the second bit line pair in response to a second equalizing instruction signal.

BRIEF DESCRIPTION OF THE DRAWINGS

These and other features of the present invention will now be described in detail with reference to the accompany drawings, in which.

DETAILED DESCRIPTION OF THE PREFERRED EMBODIMENT

Figure 1A:
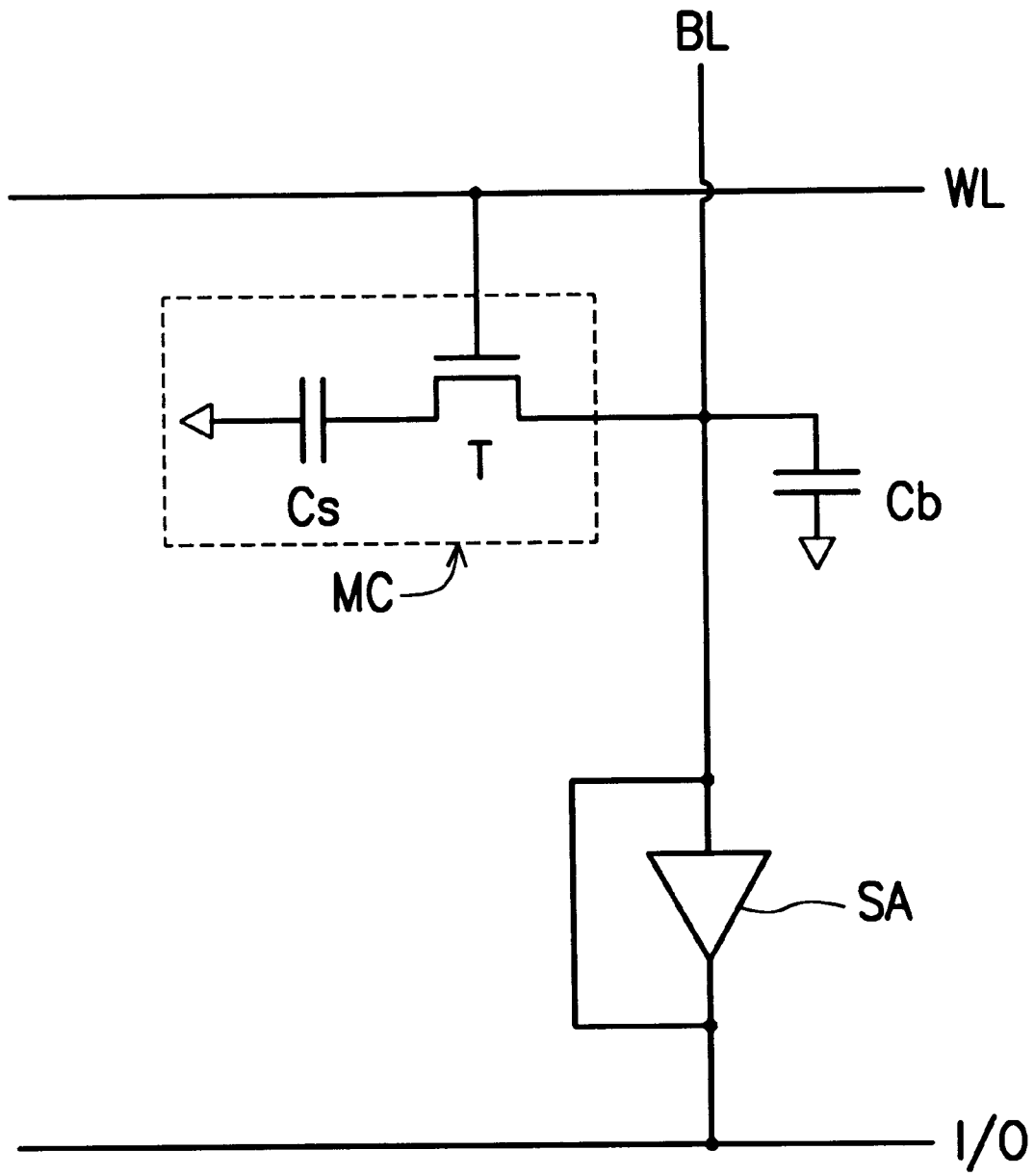
FIG. 1A shows parts of the composition of the memory cell of the traditional DRAM array.
Figure 1B:
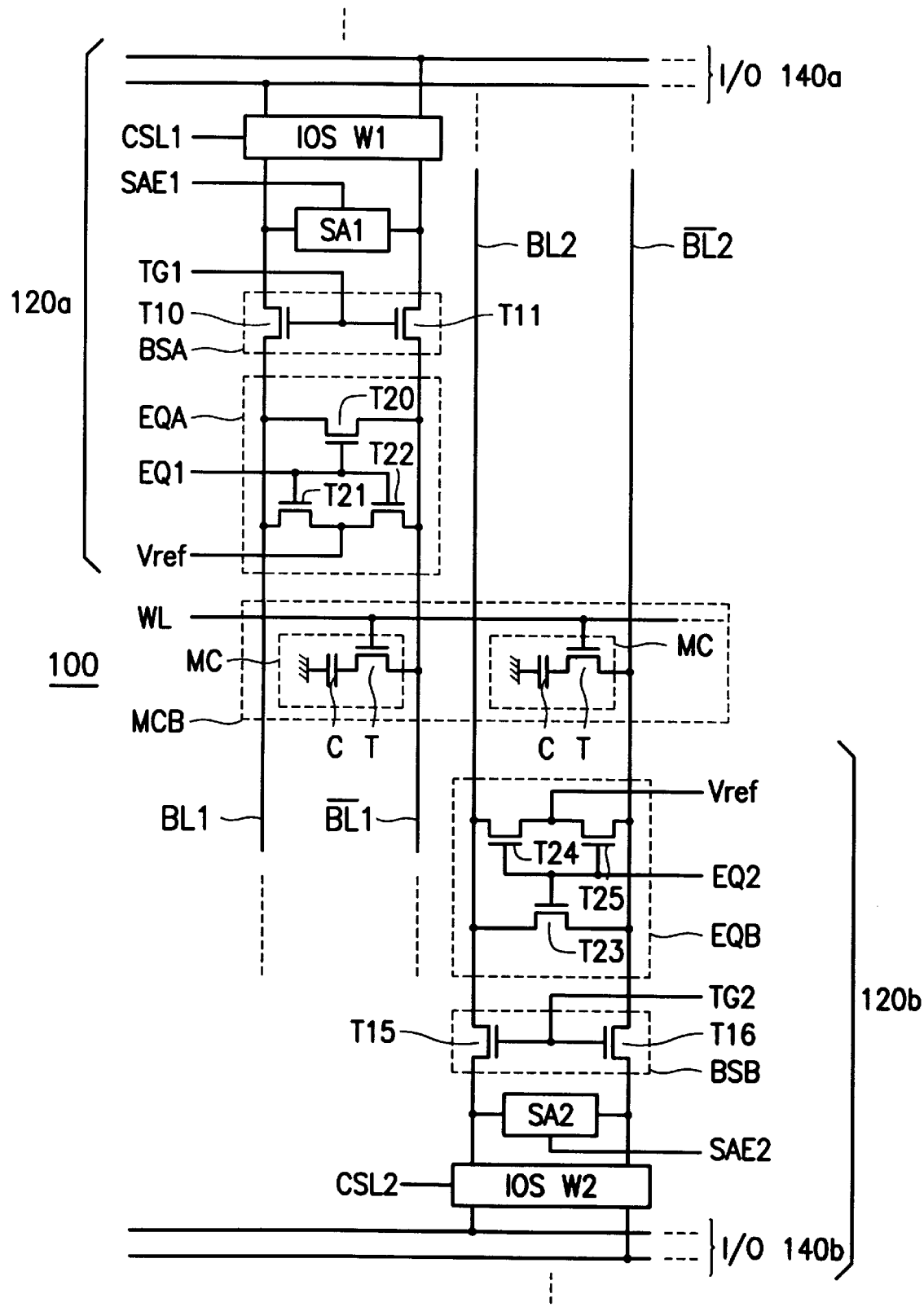
FIG. 1B shows parts of the composition of the sense amplifier and the memory cell blocks of the traditional DRAM array.
Figure 2:
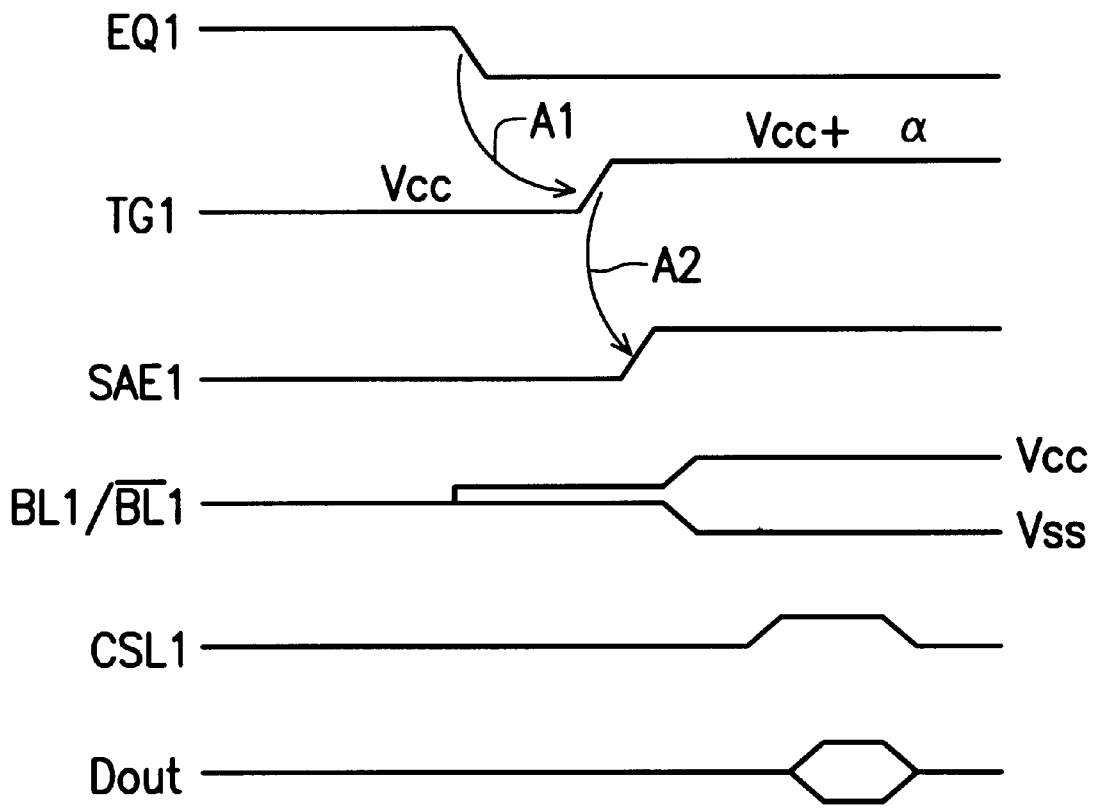
FIG. 2 shows a portion of signal waveform of sensing data in a traditional semiconductor memory device while reading.
Figure 3:
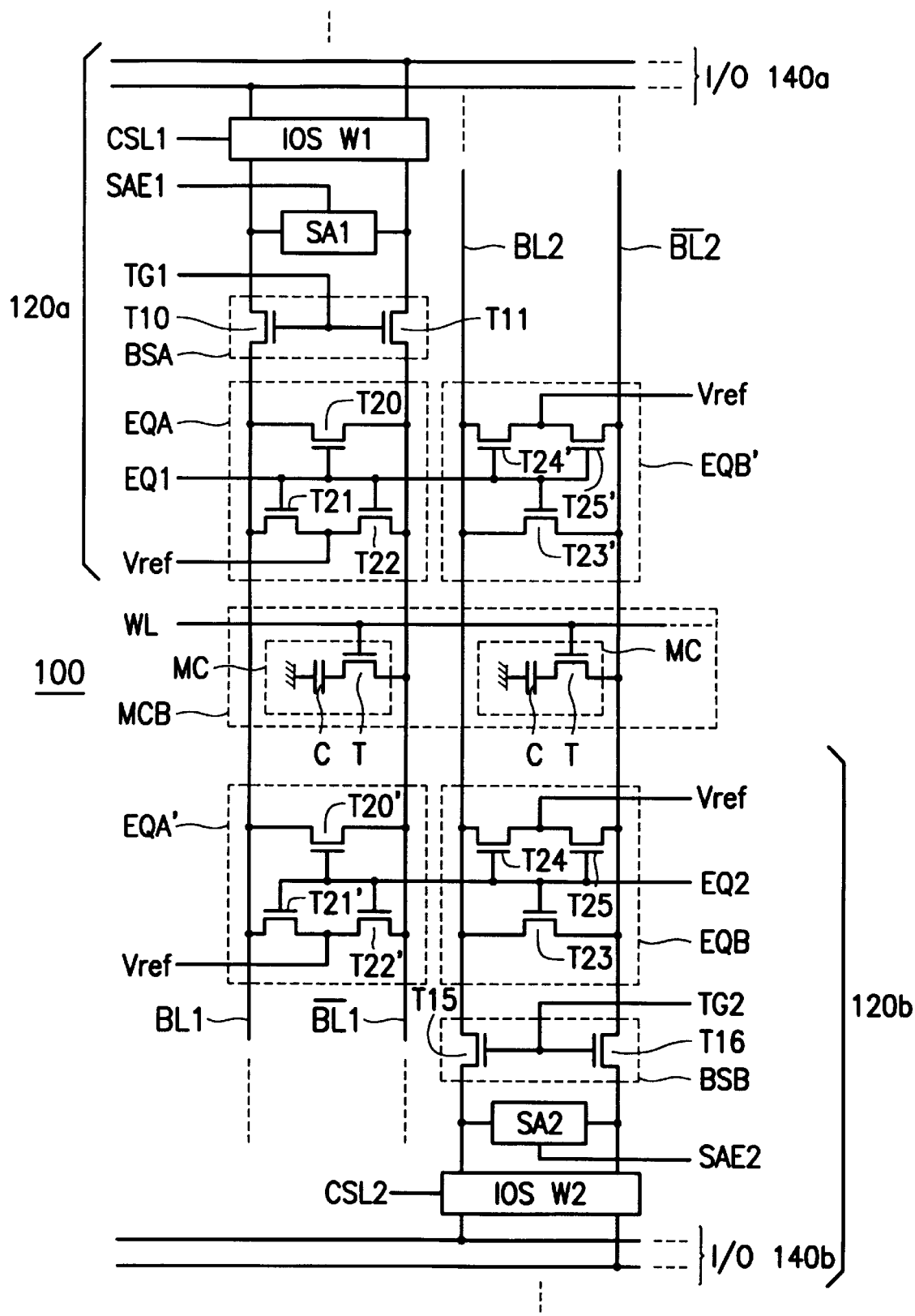
FIG. 3 shows a dual bit line equalizing circuit in a semiconductor memory device.

FIG. 3 illustrates a preferred embodiment of the dual bit line circuit of the present invention. For convenience in description, equivalent elements having the same functions as those described in the prior art are labeled with the same marks.

The present invention primarily provides a dual bit line equalizing circuit of a semiconductor memory device, wherein the memory device, for example, is a DRAM and comprised of a memory block 100, a shared sensing amplifier block 120a, 120b, and at least a pair of bit line pairs (like the adjacent dual bit line pairs BL1/$\overline{BL1}$ and BL2/$\overline{BL2}$) which cross the memory block 100 and the shared sense amplifier blocks 120a, 120b.

Referring again to FIG. 3, the dual bit line equalizing circuit disclosed in the preferred embodiment is constructed in the shared sense amplifier blocks 120a, 120b and includes two primary equalizing circuits and two secondary equalizing circuits. The primary equalizing circuit EQA is connected between terminals of the bit line pair BL1/$\overline{BL1}$, and the secondary equalizing circuit EQA' is connected between terminals of the bit line pair BL1/$\overline{BL1}$. The primary equalizing circuit EQB is connected between other terminals of the adjacent bit line pair BL2/$\overline{BL2}$, and the secondary equalizing circuit EQB' is connected between other terminals of the adjacent bit line pair BL2/$\overline{BL2}$.

The primary equalizing circuit EQA, connected between terminals of the bit line pair BL1/$\overline{BL1}$, and the secondary equalizing circuit EQB', connected between terminals of the adjacent bit line pair BL2/$\overline{BL2}$, precharge and equalize the bit line pairs BL1/$\overline{BL1}$ and BL2/$\overline{BL2}$ in response to the equalizing instruction signal EQ1.

Furthermore, the secondary equalizing circuit EQA', connected between terminals of the bit line pair BL1/$\overline{BL1}$, and the primary equalizing circuit EQB, connected between terminals of bit line pair BL2/$\overline{BL2}$, precharge and equalize the bit line pairs BL1/$\overline{BL1}$ and BL2/$\overline{BL2}$ in response to the equalizing instruction signal EQ2.

The secondary equalizing circuits EQA', EQB' include respectively at least a transistor T20', T30', respectively, and short-circuit the bit line pairs BL1/$\overline{BL1}$, BL2/$\overline{BL2}$ in response to the equalizing instruction signal EQ1, EQ2, respectively. In the preferred embodiment as shown in FIG. 3, the designs of the secondary equalizing circuit EQA', EQB' are the same as the primary circuits. In addition to transistors T20', T30', transistors T21', T22', or T24', T25' (taking n-channel transistors as an example) are used to transmit the reference potential Vref to the bit line pairs BL1/$\overline{BL1}$, BL2/$\overline{BL2}$ in response to the equalizing instruction signal EQ1, EQ2.

The improvement achieved by this invention rests in adding secondary equalizing circuits. The primary equalizing circuit EQA, connected between terminals of the bit line pair BL1/$\overline{BL1}$, and the secondary equalizing circuit EQB', connected between terminals of the adjacent bit line pair BL2/$\overline{BL2}$, precharge and equalize the bit line pairs BL1/$\overline{BL1}$ and BL2/$\overline{BL2}$. Furthermore, the secondary equalizing circuit EQA', connected between terminals of the bit line pair BL1/$\overline{BL1}$, and the primary equalizing circuit EQB, connected between terminals of bit line pair BL2/$\overline{BL2}$, precharge and equalize the bit line pairs BL1/$\overline{BL1}$ and BL2/$\overline{BL2}$. The arrangement described above can reduce the parasitic capacitance Cb and the resistance R to ½ Cb or ½ R, and the RC constant of the equalization can be reduced to a quarter of that in the prior art. Therefore, the speeding up of equalization by the preferred embodiment can reduce the reading time of two bits of data.

Also, the area of shared sense amplifier block is limited in the dual bit line equalizing circuit in the preferred embodiment, and the equalizing instruction signals EQ1 and EQ2 are used so that additional control signals are needless.

While the present invention has been described and illustrated herein with reference to the preferred embodiment thereof, it will be understood by those skilled in the art that various changes in the form and details may be made therein without departing from the spirit and the scope of the invention.

What is claimed is:

1. A dual bit line equalizing circuit for a semiconductor memory device, comprising:

a bit line pair;

a primary equalizing circuit connected between terminals of one end of the bit line pair; and a secondary equalizing circuit connected between terminals of the other end of the bit line pair.

2. A dual bit line equalizing circuit f or a semiconductor memory device, comprising:

a first bit line pair;

a second bit line pair adjacent to the first bit line pair;

a first primary equalizing circuit connected between terminals of the first bit line pair;

a first secondary equalizing circuit connected between terminals of the second bit line pair and to the first primary equalizing circuit, wherein the first primary equalizing circuit and the first secondary equalizing circuit precharge and equalize the first and the second bit line pairs in response to a first equalizing instruction signal;

a second primary equalizing circuit connected between other terminals of the second bit line pair; and a second secondary equalizing circuit connected between other terminals of the first bit line pair, wherein the second primary equalizing circuit and the second secondary equalizing circuit precharge and equalize the first and the second bit line pairs in response to a second equalizing instruction signal.

3. The dual bit line equalizing circuit as described in claim 2, wherein the first primary equalizing circuit comprising:

a first transistor short-circuiting the first bit line pair in response to the first equalizing instruction signal;

a second transistor transmitting a reference potential to one bit line of the first bit line pair in response to the first equalizing instruction signal; and a third transistor transmitting the reference potential to the other bit line of the first bit line pair in response to the first equalizing instruction signal.

4. The dual bit line equalizing circuit as described in claim 3, wherein the first secondary equalizing circuit includes a fourth transistor short-circuiting the second bit line pair in response to the first equalizing instruction signal.

5. The dual bit line equalizing circuit as described in claim 4, wherein the second primary equalizing circuit comprises:

a fifth transistor short-circuiting the second bit line pair in response to the second equalizing instruction signal;

a sixth transistor transmitting the reference potential to one bit line of the second bit line pair in response to the second equalizing instruction signal; and a seventh transistor transmitting the reference potential to the other bit line of the second bit line pair in response to the second equalizing instruction signal.

6. The dual bit line equalizing circuit as described in claim 5, wherein the second secondary equalizing circuit includes a eighth transistor short-circuiting the first bit fine pair in response to the second equalizing instruction signal.

7. A dual bit line equalizing circuit for a semiconductor memory device including a memory block and a shared sense amplifier block in which the dual bit line equalizing circuit is arranged, comprising:

a first bit line pair;

a second bit line pair adjacent to the first bit line pair, wherein the first bit line pair and the second bit line pair cross the memory block and the shared sense amplifier block;

a first primary equalizing circuit connected between terminals of the first bit line pair;

a first secondary equalizing circuit connected between terminals of the second bit line pair adjacent to the first bit line pair, wherein the first primary equalizing circuit and the first secondary equalizing circuit precharge and equalize the first and the second bit line pairs in response to a first equalizing instruction signal;

a second primary equalizing circuit connected between other terminals of the second bit line pair; and a second secondary equalizing circuit connected between other terminals of the first bit line pair adjacent to the second bit line pair, wherein the second primary equalizing circuit and the second secondary equalizing circuit precharge and equalize the first and the second bit line pairs in response to a second equalizing instruction signal.

8. The dual bit line equalizing circuit as described in claim 7, wherein the first primary equalizing circuit comprise:

a first transistor short-circuiting the first bit line pair in response to the first equalizing instruction signal;

a second transistor transmitting a reference potential to one bit line of the first bit line pair in response to the first equalizing instruction signal; and a third transistor transmitting the reference potential to the other bit line of the first bit line pair in response to the first equalizing instruction signal.

9. The dual bit line equalizing circuit as described in claim 8, wherein the second primary equalizing circuit comprise:

a fourth transistor short-circuiting the second bit line pair in response to the second equalizing instruction signal;

a fifth transistor transmitting the reference potential to one bit line of the second bit line pair in response to the second equalizing instruction signal; and a sixth transistor transmitting the reference potential to the other bit line of the second bit line pair in response to the second equalizing instruction signal.

* * * * *